United States Patent
Kasai

(10) Patent No.: US 8,439,518 B2
(45) Date of Patent: May 14, 2013

(54) DISPLAY BACKLIGHT DEVICE WITH AUXILIARY LIGHT EMITTING ELEMENT

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 119 days.

(21) Appl. No.: 13/059,647

(22) PCT Filed: Apr. 30, 2009

(86) PCT No.: PCT/JP2009/058492
§ 371 (c)(1),
(2), (4) Date: Feb. 18, 2011

(87) PCT Pub. No.: WO2010/021177
PCT Pub. Date: Feb. 25, 2010

(65) Prior Publication Data
US 2011/0149555 A1    Jun. 23, 2011

(30) Foreign Application Priority Data
Aug. 20, 2008 (JP) ................... 2008-212126

(51) Int. Cl.
*F21S 4/00* (2006.01)
*G02F 1/13357* (2006.01)

(52) U.S. Cl.
USPC .......... 362/225; 362/559; 362/97.2; 362/244; 349/62; 349/65

(58) Field of Classification Search ............ 362/611, 362/614, 616, 559, 561, 97.2, 225, 244, 245; 349/62, 65
See application file for complete search history.

(56) References Cited

U.S. PATENT DOCUMENTS

| | | | | |
|---|---|---|---|---|
| 7,195,367 | B2 * | 3/2007 | Hong et al. | 362/97.3 |
| 7,534,023 | B2 * | 5/2009 | Ahn et al. | 362/561 |
| 7,682,059 | B2 * | 3/2010 | Choi et al. | 362/560 |
| 8,149,352 | B2 * | 4/2012 | Park et al. | 349/68 |
| 8,179,499 | B2 * | 5/2012 | Lee | 349/68 |
| 8,206,021 | B2 * | 6/2012 | Tsubokura | 362/613 |
| 2006/0232964 | A1 * | 10/2006 | Hoshi et al. | 362/231 |
| 2006/0245209 | A1 * | 11/2006 | Jeong et al. | 362/612 |
| 2007/0291512 | A1 * | 12/2007 | Lee et al. | 362/633 |
| 2009/0316065 | A1 * | 12/2009 | Tsubokura | 349/58 |

FOREIGN PATENT DOCUMENTS

| | | |
|---|---|---|
| JP | 2000-149648 A | 5/2000 |
| JP | 2000-310776 A | 11/2000 |
| JP | 2005-157071 A | 6/2005 |
| JP | 2006-313747 A | 11/2006 |

OTHER PUBLICATIONS

Official Communication issued in International Patent Application No. PCT/JP2009/058492, mailed on Aug. 11, 2009.

* cited by examiner

*Primary Examiner* — Ismael Negron
(74) *Attorney, Agent, or Firm* — Keating & Bennett, LLP

(57) ABSTRACT

An illuminating device includes a hot-cathode fluorescent tube (discharge tube) and a light emitting surface that emits light from the hot-cathode fluorescent tube. An auxiliary light emitting portion is provided in the vicinity of a non-lighting region of the hot-cathode fluorescent tube. The auxiliary light emitting portion includes an optical fiber having an incident portion for receiving light from the hot-cathode fluorescent tube, and a light guide plate that receives light from the optical fiber and emits the incident light toward the light emitting surface.

6 Claims, 8 Drawing Sheets

DISPLAY BACKLIGHT DEVICE WITH AUXILIARY LIGHT EMITTING ELEMENT

TECHNICAL FIELD

The present invention relates to an illuminating device used for a backlight or the like, and a display device using the illuminating device.

BACKGROUND ART

In recent years, a display device including a liquid crystal panel as a flat display portion, as typified by a liquid crystal display device, is becoming the mainstream of, e.g., a household television receiver. The liquid crystal panel has many features such as thinness and light weight compared to a conventional Broun tube. Such a liquid crystal display device includes an illuminating device (backlight) and a liquid crystal panel. The illuminating device emits light and the liquid crystal panel displays a desired image by serving as a shutter with respect to light from a light source provided in the illuminating device. The television receiver displays information such as characters and images contained in video signals of a television broadcast on the display surface of the liquid crystal panel.

The above illuminating device is broadly divided into a direct type and an edge-light type depending on the arrangement of the light source with respect to the liquid crystal panel. A liquid crystal display device including a liquid crystal panel of 20 inches or more generally uses the direct type illuminating device that can achieve high brightness and large size more easily than the edge-light type illuminating device. In the direct type illuminating device, a plurality of light sources are located on the back (non-display surface) side of the liquid crystal panel. Since the light sources are located directly on the back side of the liquid crystal panel, many light sources can be used, and the brightness can be easily increased. Therefore, the direct type illuminating device is suitable for high brightness and large size. Moreover, the direct type illuminating device has a hollow structure and is light-weight even if the size is increased. In this regard, the direct type illuminating device is suitable for high brightness and large size.

In the above conventional illuminating device, as described in, e.g., Patent Document 1, a plurality of hot-cathode fluorescent tubes are provided as light sources, each of the hot-cathode fluorescent tubes has sockets at both ends, and the individual hot-cathode fluorescent tubes are connected to a lighting drive circuit via cables connected to the sockets. In the conventional illuminating device, it is proposed to drive the hot-cathode fluorescent tubes by high-frequency lighting of the lighting drive circuit.

PRIOR ART DOCUMENTS

Patent Documents

Patent Document 1: JP 2000-149648 A

DISCLOSURE OF INVENTION

Problem to be Solved by the Invention

However, the above conventional illuminating device has a problem that the light emission quality is reduced when the size of the device is increased with an increase in screen size of the liquid crystal panel.

Hereinafter, the problem of the conventional illuminating device will be described in detail with reference to FIGS. 7 and 8.

FIG. 7 is a diagram for explaining the main configuration of the conventional illuminating device. FIG. 8 is a graph showing the problem of the conventional illuminating device.

As shown in FIG. 7, the conventional illuminating device 50 includes, e.g., five hot-cathode fluorescent tubes 51 spaced at predetermined intervals. Each of the hot-cathode fluorescent tubes 51 includes a glass tube portion 51a that is made of a glass material and electrode portions 51b that are provided at both ends of the glass tube portion 51a and connected to sockets (not shown). In the individual hot-cathode fluorescent tubes 51, the glass tube portion 51a is divided into two regions, i.e., an effective light emitting region and a non-lighting region represented by "A" and "B" in FIG. 7, respectively. Specifically, the glass tube portion 51a of the hot-cathode fluorescent tube 51 has the effective light emitting region A in the central portion where light is emitted at substantially constant brightness and the non-lighting regions B where the brightness decreases as it is closer to the respective electrode portions 51b compared to the brightness in the effective light emitting region A.

More specifically, using the boundary X0 (FIG. 7) between the glass tube portion 51a and the electrode portion 51b of the hot-cathode fluorescent tube 51 as a reference point, the value of the brightness ratio in the non-lighting region B extending to a point that is about 25 mm away from the reference point in the tube axis direction (i.e., the boundary X1 (FIG. 7) between the effective light emitting region A and the non-lighting region B) is less than 100%, as indicated by the graph 60 in FIG. 8. On the other hand, the value of the brightness ratio in the effective light emitting region A that is on the right side of the boundary X1 in FIG. 7 is substantially 100%.

As described above, in the glass tube portion 51a of the hot-cathode fluorescent tube (discharge tube) 51, the non-lighting regions B have a smaller brightness ratio than that in the effective light emitting region A (the central portion) and are present in the vicinity of the electrode portions 51b, respectively. Therefore, in the conventional illuminating device 50, the light emitting surface that emits light from the hot-cathode fluorescent tubes 51 to the outside faces these non-lighting regions B of the hot-cathode fluorescent tubes 51 and can reduce the brightness. In particular, when the size of the conventional illuminating device 50 is increased, the light emitting surface faces the non-lighting regions B of the hot-cathode fluorescent tubes 51, and consequently the brightness is reduced at both end portions of the light emitting surface opposed to the non-lighting regions B in the vicinity of the left and right electrode portions 51b compared to the central portion of the light emitting surface opposed to the effective light emitting regions A. Thus, nonuniform brightness is likely to occur on the light emitting surface. As a result, the increase in size of the conventional illuminating device 50 may cause a reduction in the light emission quality.

The hot-cathode fluorescent tube can be made long enough to deal with the increase in size of the illuminating device with increasing the screen size of the liquid crystal panel. However, the general hot-cathode fluorescent tube has a maximum length of about 2 m 40 cm. Therefore, if the hot-cathode fluorescent tube is longer than the maximum length in order to accommodate the liquid crystal panel with a diagonal size of, e.g., greater than 108 inches, there is another problem of a significant increase in cost of the hot-cathode fluorescent tube and the illuminating device.

With the foregoing in mind, it is an object of the present invention to provide an illuminating device that can prevent a reduction in the light emission quality even if the size of the illuminating device is increased, and a display device using the illuminating device.

Means for Solving Problem

To achieve the above object, an illuminating device of the present invention includes a discharge tube and a light emitting surface that emits light from the discharge tube. An auxiliary light emitting portion that emits light toward the light emitting surface is provided in the vicinity of a non-lighting region of the discharge tube.

In the illuminating device with the above configuration, the auxiliary light emitting portion that emits light toward the light emitting surface is provided in the vicinity of the non-lighting region of the discharge tube. Thus, unlike the conventional example, it is possible to prevent a reduction in the light emission quality even if the size of the illuminating device is increased.

In the context of the present invention, the term "non-lighting region" of the discharge tube means a region where the brightness ratio is smaller than that in the effective light emitting region of the discharge tube where light is emitted at substantially constant brightness.

In the above illuminating device, a plurality of the discharge tubes may be provided along a direction perpendicular to a longitudinal direction of the discharge tubes, and the auxiliary light emitting portion may include an optical fiber having an incident portion that is located near the discharge tube to receive light from the discharge tube, and a light guide plate that is located parallel to the perpendicular direction, receives light from the optical fiber, and emits the incident light toward the light emitting surface.

In this case, the light of the discharge tubes is collected by the optical fiber and then emitted from the light guide plate toward the light emitting surface as light of the auxiliary light emitting portion. Therefore, even if the size of the illuminating device is increased, it is possible to reliably prevent a reduction in the light emission quality.

In the above illuminating device, a plurality of the discharge tubes may be provided along the direction perpendicular to the longitudinal direction of the discharge tubes, and the auxiliary light emitting portion may include an auxiliary discharge tube that is located parallel to the perpendicular direction.

In this case, the light of the auxiliary discharge tube is emitted toward the light emitting surface as light of the auxiliary light emitting portion. Therefore, even if the size of the illuminating device is increased, it is possible to reliably prevent a reduction in the light emission quality.

In the above illuminating device, the auxiliary light emitting portion may include a light emitting diode that emits light toward the light emitting surface.

In this case, the light of the light emitting diode is emitted toward the light emitting surface as light of the auxiliary light emitting portion. Therefore, even if the size of the illuminating device is increased, it is possible to reliably prevent a reduction in the light emission quality.

In the above illuminating device, a plurality of the discharge tubes may be provided along the direction perpendicular to the longitudinal direction of the discharge tubes, and the auxiliary light emitting portion may include a light emitting diode that emits light, and a light guide plate that is located parallel to the perpendicular direction, receives light from the light emitting diode, and emits the incident light toward the light emitting surface.

In this case, the light of the light emitting diode is emitted from the light guide plate toward the light emitting surface as light of the auxiliary light emitting portion. Therefore, even if the size of the illuminating device is increased, it is possible to reliably prevent a reduction in the light emission quality.

In the above illuminating device, it is preferable that the auxiliary light emitting portion is provided on the light emitting surface side with respect to the discharge tubes.

In this case, the light from the auxiliary light emitting portion is emitted toward the light emitting surface without being blocked by the discharge tubes. Thus, the utilization efficiency of light from the auxiliary light emitting portion can be improved easily, and a reduction in the light emission quality can be prevented more reliably.

A display device of the present invention includes any one of the above illuminating devices.

The display device with the above configuration uses the illuminating device that can prevent a reduction in the light emission quality even if the size of the illuminating device is increased. Thus, the display device can easily achieve a large screen and high performance.

Effects of the Invention

The present invention can provide an illuminating device that can prevent a reduction in the light emission quality even if the size of the illuminating device is increased, and a display device using the illuminating device.

DESCRIPTION OF THE INVENTION

Figure 1:
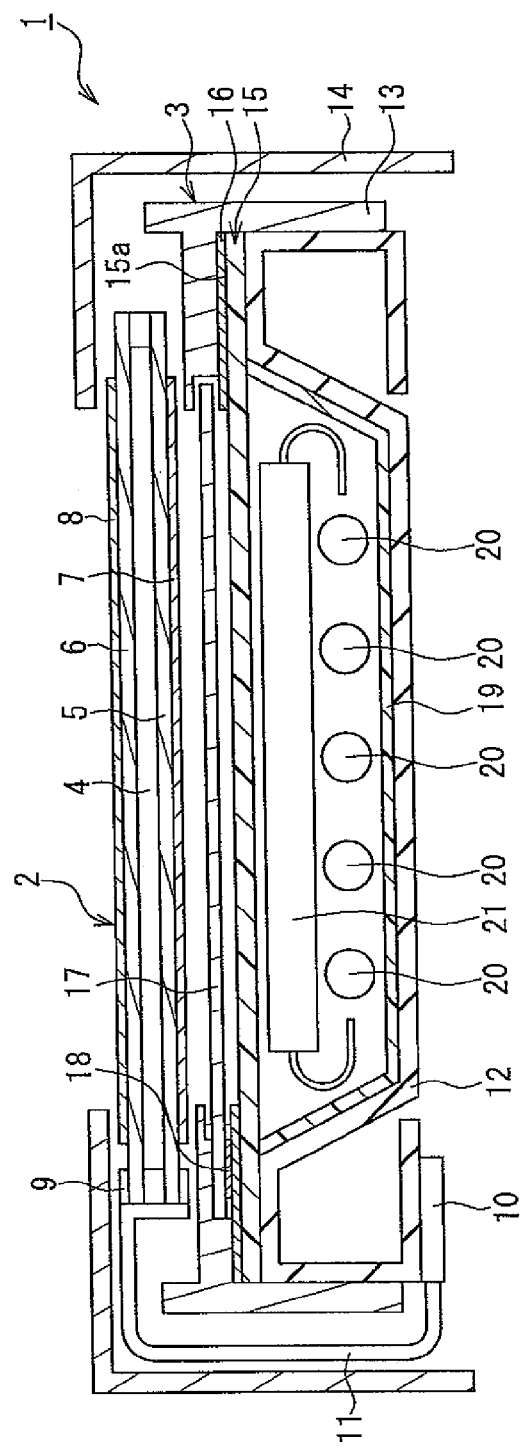
FIG. 1 is a schematic cross-sectional view showing an illuminating device and a liquid crystal display device according to Embodiment 1 of the present invention.

Hereinafter, preferred embodiments of an illuminating device and a display device using the illuminating device of the present invention will be described with reference to the drawings. In the following description, the present invention is applied to a transmission-type liquid crystal display device. The size and size ratio of each of the constituent members in the drawings do not exactly reflect those of the actual constituent members.

Embodiment 1

FIG. 1 is a schematic cross-sectional view showing an illuminating device and a liquid crystal display device according to Embodiment 1 of the present invention. In FIG.

1, a liquid crystal display device 1 of this embodiment includes a liquid crystal panel 2 and an illuminating device 3 of the present invention. The liquid crystal panel 2 serves as a display portion that is placed with the upper side of FIG. 1 being identified as a viewer side (display surface side). The illuminating device 3 is placed on the non-display surface side of the liquid crystal panel 2 (i.e., the lower side of FIG. 1) and irradiates the liquid crystal panel 2 with illumination light.

The liquid crystal panel 2 includes a liquid crystal layer 4, an active matrix substrate 5 and a color filter substrate 6 that are a pair of transparent substrates sandwiching the liquid crystal layer 4, and polarizing plates 7, 8 that are provided on the outer surfaces of the active matrix substrate 5 and the color filter substrate 6, respectively. The liquid crystal panel 2 also includes a driver 9 for driving the liquid crystal panel 2 and a drive circuit 10 connected to the driver 9 via a flexible printed board 11. The liquid crystal panel 2 is configured so that the liquid crystal layer 4 can be driven pixel by pixel. In the liquid crystal panel 2, the polarization state of the illumination light that has entered through the polarizing plate 7 is modulated by the liquid crystal layer 4, and the amount of light passing through the polarizing plate 8 is controlled, thereby displaying a desired image.

The liquid crystal mode or pixel structure of the liquid crystal panel 2 may be determined arbitrarily. The drive mode of the liquid crystal panel 2 also may be determined arbitrarily. That is, any liquid crystal panel capable of displaying information can be used as the liquid crystal panel 2. For this reason, a detailed structure of the liquid crystal panel 2 is not illustrated in FIG. 1, and a description of the detailed structure is omitted.

The illuminating device 3 includes a chassis 12 that has a bottom and is open to the liquid crystal panel 2 side (i.e., the upper side of FIG. 1), and a frame 13 that is provided on the chassis 12 near the liquid crystal panel 2. The chassis 12 and the frame 13 are made of a metal or a synthetic resin and supported by a bezel 14, which has an L-shaped cross section, while the liquid crystal panel 2 is located above the frame 13. With this configuration, the illuminating device 3 is joined to the liquid crystal panel 2, so that they are integrated into the transmission-type liquid crystal display device 1 in which illumination light from the illuminating device 3 enters the liquid crystal panel 2.

The illuminating device 3 includes a diffusing plate 15 that covers the opening of the chassis 12, an optical sheet 17 that is located above the diffusing plate 15 to face the liquid crystal panel 2, and a reflecting sheet 19 that is provided on the inner surface of the chassis 12. The illuminating device 3 also includes a plurality of, e.g., five hot-cathode fluorescent tubes 20 that are provided in the chassis 12 under the liquid crystal panel 2. Thus, the direct type illuminating device 3 is configured. In the illuminating device 3, light is emitted from each of the hot-cathode fluorescent tubes 20 and directed to the liquid crystal panel 2 as the illumination light.

The diffusing plate 15 is made of, e.g., a rectangular synthetic resin or glass material with a thickness of about 2 mm. The diffusing plate 15 diffuses light from the hot-cathode fluorescent tubes 20 and emits the diffused light toward the optical sheet 17. The four sides of the diffusing plate 15 are placed on the frame-shaped upper surface of the chassis 12, and sandwiched between this surface of the chassis 12 and the inner surface of the flame 13 via an elastically deformable pressing member 16, so that the diffusing plate 15 is incorporated into the illuminating device 3. Moreover, the central portion of the diffusing plate 15 is supported by a transparent supporting member (not shown) located inside the chassis 12. This can prevent the diffusing plate 15 from being bent inward. Further, the diffusing plate 15 has a light emitting surface 15*a* that emits the light from the hot-cathode fluorescent tubes (discharge tubes) 20 toward the liquid crystal panel 2.

The diffusing plate 15 is movably held between the chassis 12 and the pressing member 16. Even if the diffusing plate 15 expands and contracts (i.e., plastic deformation) due to the influence of heat such as a heat generation of the hot-cathode fluorescent tubes 20 or a temperature rise in the chassis 12, the pressing member 16 is elastically deformed to absorb this plastic deformation. Accordingly, a reduction in the diffusibility of light from the hot-cathode fluorescent tubes 20 can be minimized. The diffusing plate 15 consisting of the glass material, which has higher heat resistance than the synthetic resin, is preferred because it is not likely to cause warpage, yellowing, thermal deformation, etc. under the influence of heat.

The optical sheet 17 includes a condenser sheet made of, e.g., a synthetic resin film with a thickness of about 0.5 mm to improve the brightness of the illumination light to the liquid crystal panel 2. Moreover, a known optical sheet material such as a prism sheet, a diffusing sheet, or a polarizing sheet may be formed on the optical sheet 17 as needed to improve the display quality on the display surface of the liquid crystal panel 2. The optical sheet 17 converts the light emitted from the diffusing plate 15 into planar light having a uniform brightness not less than a predetermined value (e.g., 10000 $cd/m^2$) and allows the planar light to enter the liquid crystal panel 2 as illumination light. In addition to the above configuration, e.g., an optical member such as a diffusing sheet for controlling the viewing angle of the liquid crystal panel 2 may be formed on the liquid crystal panel 2 (i.e., the display surface side) as needed.

The optical sheet 17 has a protrusion that protrudes to the left of FIG. 1 in the middle of the left side shown in FIG. 1, which is to be the upper side, e.g., in the actual use of the liquid crystal display device 1. In the optical sheet 17, only the protrusion is sandwiched between the inner surface of the frame 13 and the pressing member 16 via an elastic material 18. Thus, the optical sheet 17 is elastically incorporated into the illuminating device 3. Therefore, even if the optical sheet 17 expands and contracts (i.e., plastic deformation) due to the influence of heat such as a heat generation of the hot-cathode fluorescent tubes 20, the optical sheet 17 is able to stretch freely based on the protrusion. Accordingly, the occurrence of a wrinkle or distortion in the optical sheet 17 can be minimized. Consequently, in the liquid crystal display device 1, degradation of the display quality such as nonuniform brightness can be prevented from occurring on the display surface of the liquid crystal panel 2 as much as possible due to the distortion or the like of the optical sheet 17.

The hot-cathode fluorescent tubes 20 are straight tubes with excellent luminous efficacy, each of which has a diameter of about 25 to 40 mm. The hot-cathode fluorescent tubes 20 are held in the chassis 12 by a light source holder (not shown) while maintaining a predetermined distance between each of the diffusing plate 15, the fluorescent tube, and the reflecting sheet 19.

The reflecting sheet 19 is made of, e.g., a metal thin film that has a high optical reflectance such as aluminum or silver and a thickness of about 0.2 to 0.5 mm. The reflecting sheet 19 functions as a reflector that reflects light from the hot-cathode fluorescent tubes 20 toward the diffusing plate 15. Thus, in the illuminating device 3, light emitted from the hot-cathode fluorescent tubes 20 is efficiently reflected toward the diffusing plate 15, so that both the utilization efficiency of the light from the hot-cathode fluorescent tubes 20 and the brightness of the light from the diffusing plate 15 can be improved. Other than this description, the inner surface of the chassis 12 may be provided as a reflector, e.g., by using a reflecting sheet material of a synthetic resin instead of the metal thin film or applying a white coating with a high optical reflectance to the inner surface of the chassis 12.

The illuminating device 3 includes auxiliary light emitting portions 21 that emit light toward the light emitting surface 15a, in addition to the hot-cathode fluorescent tubes 20. The auxiliary light emitting portions 21 are located on the light emitting surface 15a side with respect to the hot-cathode fluorescent tubes 20. Moreover, the auxiliary light emitting portions 21 are provided in the vicinity of non-lighting regions of the hot-cathode fluorescent tubes 20 (as will be described in detail later) so as to minimize the occurrence of nonuniform brightness on the light emitting surface 15a.

Hereinafter, the main configuration of the illuminating device 3 of this embodiment will be described in detail with reference to FIG. 2 as well as FIG. 1.

Figure 2:
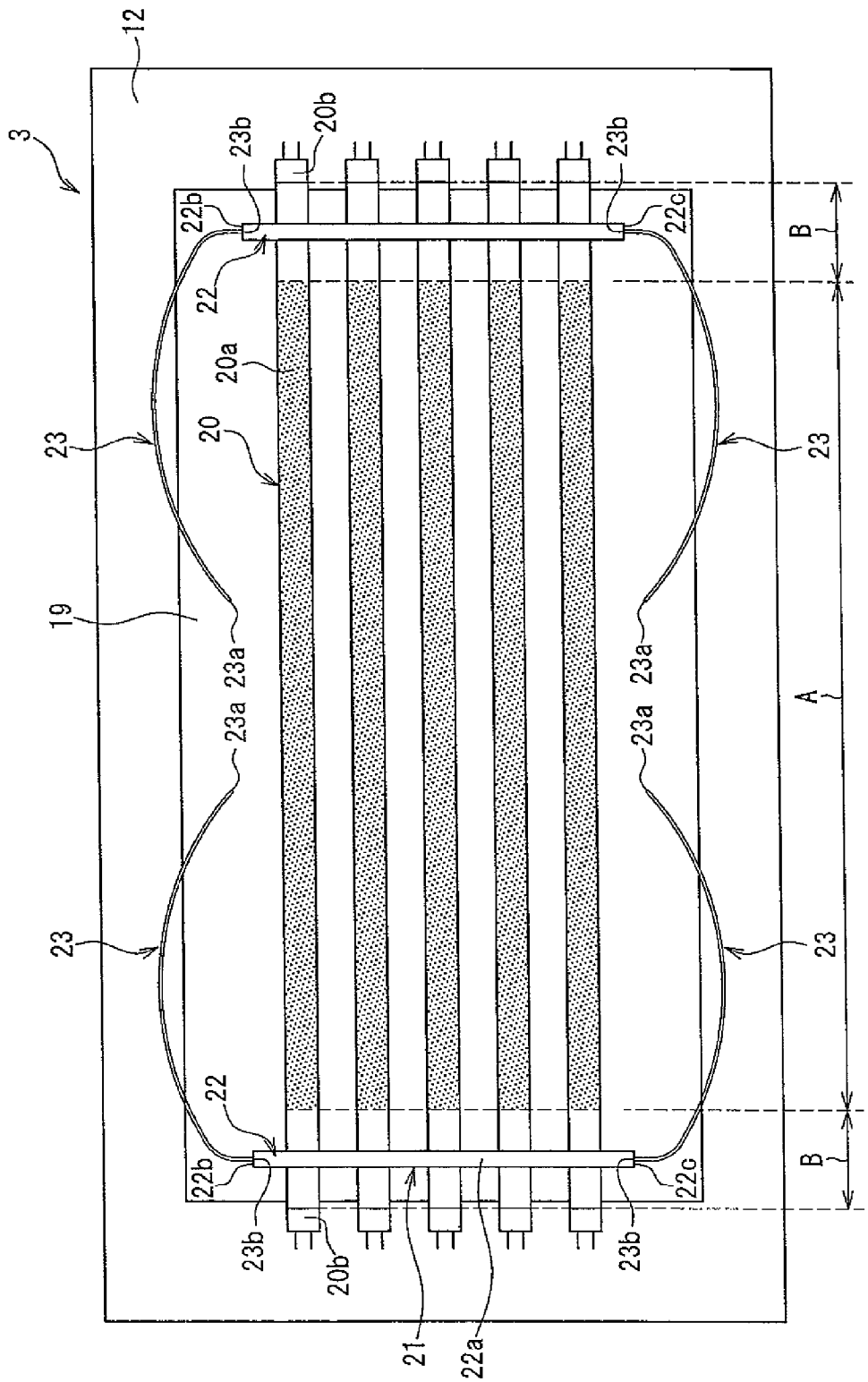
FIG. 2 is a diagram for explaining the main configuration of the above illuminating device.

FIG. 2 is a diagram for explaining the main configuration of the illuminating device.

As shown in FIG. 2, in the illuminating device 3 of this embodiment, the whole of five hot-cathode fluorescent tubes 20 are placed in the chassis 12. The hot-cathode fluorescent tubes 20 are spaced at predetermined intervals along the direction (i.e., the vertical direction of FIG. 2) perpendicular to the longitudinal direction (i.e., the horizontal direction of FIG. 2) of them. Each of the hot-cathode fluorescent tubes 20 includes a glass tube portion 20a that is made of a glass material and electrode portions 20b that are provided at both ends of the glass tube portion 20a and connected to sockets (not shown). As shown in FIG. 2, the reflecting sheet 19 is disposed between the left and right electrode portions 20b of the hot-cathode fluorescent tubes 20 in the chassis 12, and thus can efficiently reflect both light from the hot-cathode fluorescent tubes 20 and light from the auxiliary light emitting portions toward the light emitting surface 15a.

Figure 7:
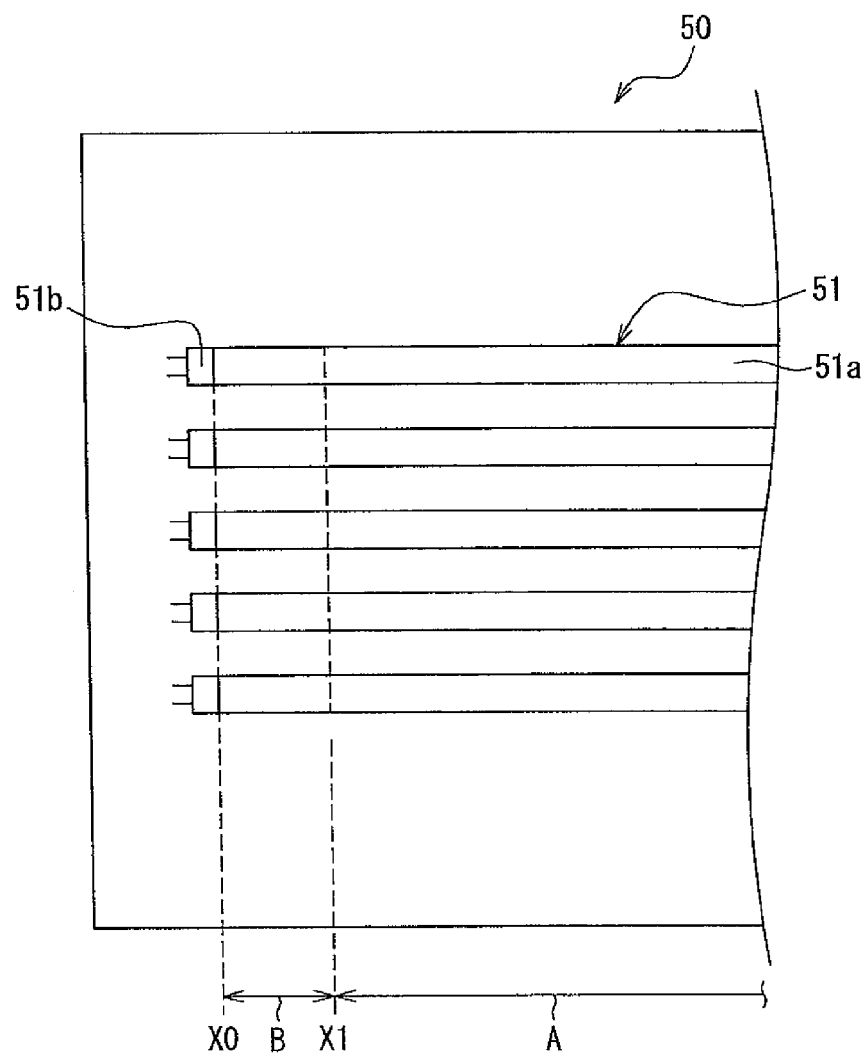
FIG. 7 is a diagram for explaining the main configuration of a conventional illuminating device.
Figure 8:
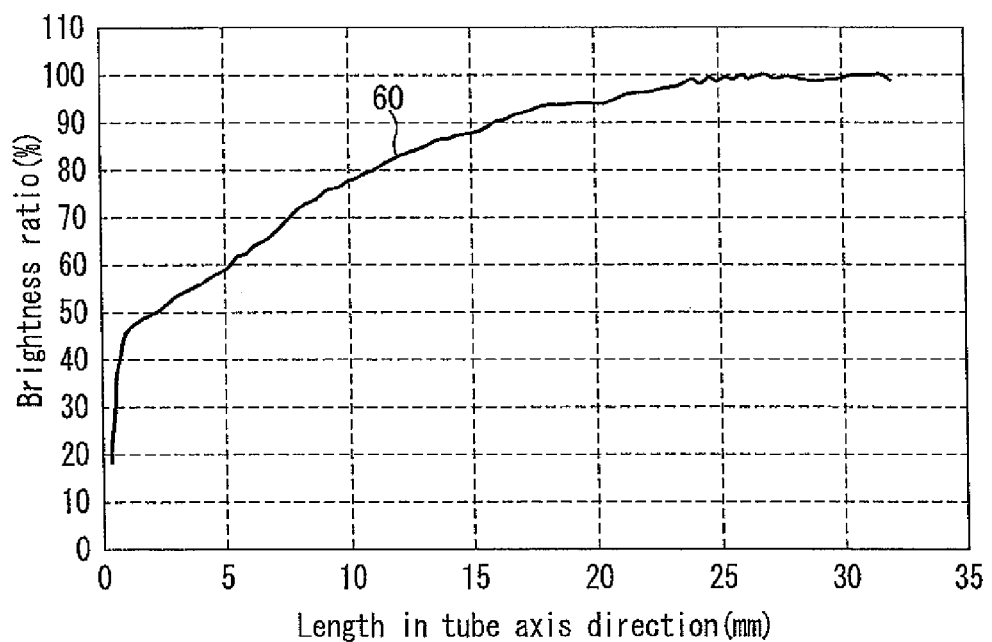
FIG. 8 is a graph showing the problem of the conventional illuminating device.

In the individual hot-cathode fluorescent tubes 20, similarly to the hot-cathode fluorescent tubes 51 shown in FIG. 7, the glass tube portion 20a is divided into two regions, i.e., an effective light emitting region and a non-lighting region represented by "A" and "B" in FIG. 2, respectively. Specifically, the glass tube portion 20a of the hot-cathode fluorescent tube 20 has the effective light emitting region A (indicated by dots in FIG. 2) in the central portion where light is emitted at substantially constant brightness and the non-lighting regions B where the brightness decreases as it is closer to the respective electrode portions 20b compared to the brightness in the effective light emitting region A. Each of the hot-cathode fluorescent tubes 20 emits light so that the brightness ratio of the non-lighting region B to the effective light emitting region A is approximately in the range of 20% to less than 100%, as indicated by the curve 60 in FIG. 8.

In the illuminating device 3 of this embodiment, the auxiliary light emitting portions 21 are provided to be symmetrical with respect to the center of the chassis 12 in the vicinity of the left and right non-lighting regions B. Each of the left and right auxiliary light emitting portions 21 includes a light guide plate 22 in the form of a flat plate and two optical fibers 23. The light guide plate 22 is made of, e.g., a transparent synthetic resin and parallel to the direction perpendicular to the longitudinal direction of the hot-cathode fluorescent tubes 20. Moreover, the light guide plate 22 is attached to the inside of the chassis 12 by a supporting member (not shown) so that it is located in the middle of the non-lighting regions B between the diffusing plate 15 and the hot-cathode fluorescent tubes 20.

Each of the two optical fibers 23 has an incident portion 23a that is located near the hot-cathode fluorescent tube 20 to receive light from this hot-cathode fluorescent tube 20 and an exit portion 23b that emits the light that has entered from the incident portion 23a. The optical fibers 23 are attached to the inside of the chassis 12 by a supporting member (not shown), and the incident portions 23a are located near the effective light emitting regions A of the hot-cathode fluorescent tubes 20. The exit portions 23b are provided in contact with incident surfaces 22b, 22c of the light guide plate 22. Accordingly, the light that is emitted from the hot-cathode fluorescent tubes 20 and enters the incident portions 23a can be efficiently introduced into the light guide plate 22. In each of the auxiliary light emitting portions 21, while the light incident from the incident surfaces 22b, 22c of the light guide plate 22 is directed in the above perpendicular direction within the light guide plate 22, the incident light is allowed to exit appropriately from a light emitting surface 22a of the light guide plate 22 that faces the diffusing plate 15. With this configuration, in the illuminating device 3 of this embodiment, the light from each of the auxiliary light emitting portions 21 can improve the brightness in the portions of the light emitting surface 15a opposed to the non-lighting regions B to the extent that the brightness is substantially the same as the brightness in the portion of the light emitting surface 15a opposed to the effective light emitting regions A. Thus, it is possible to prevent the occurrence of nonuniform brightness on the light emitting surface 15a.

In the illuminating device 3 of this embodiment with the above configuration, the auxiliary light emitting portions 21 that emit light toward the light emitting surface 15a are provided in the vicinity of the non-lighting regions B of the hot-cathode fluorescent tubes 20. With this configuration, unlike the conventional example, the illuminating device 3 of this embodiment can prevent the occurrence of nonuniform brightness even if the size of the illuminating device is increased, and thus can prevent a reduction in the light emission quality.

The illuminating device 3 of this embodiment uses the auxiliary light emitting portions 21, each of which includes the light guide plate 22 and the optical fibers 23. With this configuration, in the illuminating device 3 of this embodiment, the light of the hot-cathode fluorescent tubes 20 is collected by the optical fibers 23 and then emitted from the light guide plate 22 toward the light emitting surface 15a as light of the auxiliary light emitting portion 21. Therefore, even if the size of the illuminating device 3 is increased, it is possible to reliably prevent a reduction in the light emission quality.

In the illuminating device 3 of this embodiment, the auxiliary light emitting portions 21 are located on the light emitting surface 15a side with respect to the hot-cathode fluorescent tubes 20. Therefore, the light from the auxiliary light emitting portions 21 can be emitted toward the light emitting surface 15a without being blocked by the hot-cathode fluorescent tubes 20. Thus, the illuminating device 3 of this embodiment can easily improve the utilization efficiency of light from the auxiliary light emitting portions 21, and also can prevent a reduction in the light emission quality more reliably.

The liquid crystal display device 1 of this embodiment uses the illuminating device 3 that can prevent a reduction in the light emission quality even if the size of the illuminating device is increased. Thus, the liquid crystal display device 1 can easily achieve a large screen and high performance.

Embodiment 2

Figure 3:
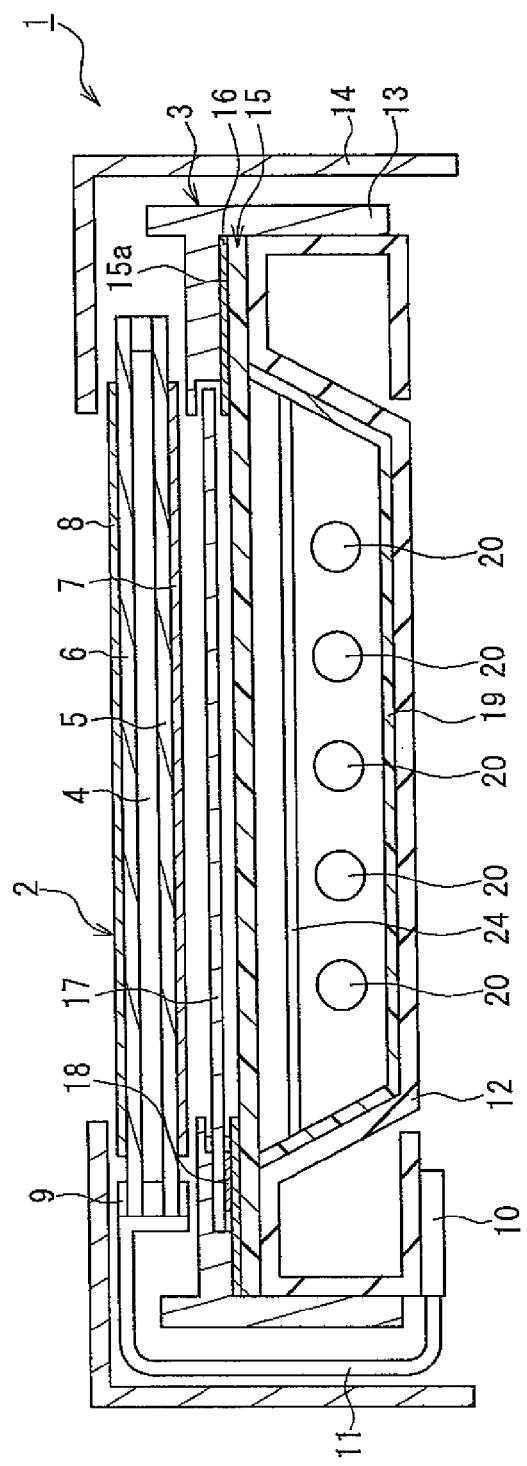
FIG. 3 is a schematic cross-sectional view showing an illuminating device and a liquid crystal display device according to Embodiment 2 of the present invention.
Figure 4:
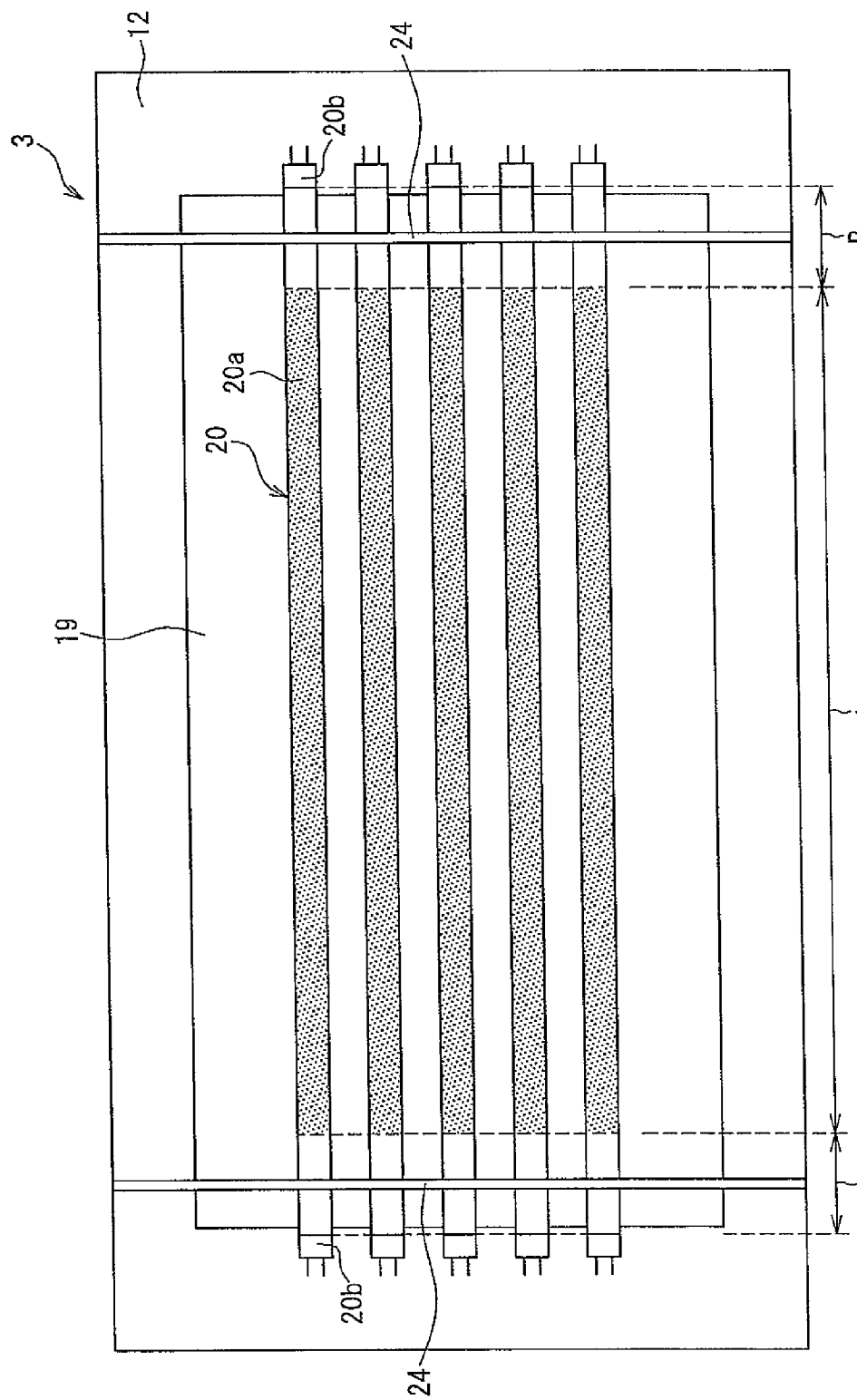
FIG. 4 is a diagram for explaining the main configuration of the illuminating device shown in FIG. 3.

FIG. 3 is a schematic cross-sectional view showing an illuminating device and a liquid crystal display device according to Embodiment 2 of the present invention. FIG. 4 is a diagram for explaining the main configuration of the illuminating device shown in FIG. 3. In FIGS. 3 and 4, this embodiment mainly differs from Embodiment 1 in that a cold-cathode fluorescent tube is used as the auxiliary light emitting portion. The same components as those in Embodiment 1 are denoted by the same reference numerals, and the explanation will not be repeated.

As shown in FIGS. 3 and 4, the illuminating device 3 of this embodiment uses cold-cathode fluorescent tubes 24 as the auxiliary light emitting portions. Specifically, the cold-cathode fluorescent tubes 24 are provided to be symmetrical with respect to the center of the chassis 12 in the vicinity of the left and right non-lighting regions B. The cold-cathode fluorescent tubes 24 are auxiliary discharge tubes located parallel to the direction perpendicular to the longitudinal direction of the hot-cathode fluorescent tubes 20. Moreover, the cold-cathode fluorescent tubes 24 can be, e.g., thin tubes with excellent luminous efficacy, each of which has a diameter of about 3.0 to 4.0 mm.

Each of the cold-cathode fluorescent tubes 24 is attached to the chassis 12 so that it is located in the middle of the non-lighting regions B between the diffusing plate 15 and the hot-cathode fluorescent tubes 20. The cold-cathode fluorescent tubes 24 emit light toward the light emitting surface 15a by performing the lighting operation. With this configuration, similarly to Embodiment 1, the illuminating device 3 of this embodiment can prevent the occurrence of nonuniform brightness on the light emitting surface 15a.

This embodiment can have the effects comparable to those of Embodiment 1 due to the above configuration. Moreover, the illuminating device 3 of this embodiment uses the cold-cathode fluorescent tubes (auxiliary discharge tubes) 24 as the auxiliary light emitting portions. With this configuration, in the illuminating device 3 of this embodiment, the light from each of the cold-cathode fluorescent tubes 24 is emitted toward the light emitting surface 15a as light of the auxiliary light emitting portion. Therefore, even if the size of the illuminating device 3 is increased, it is possible to reliably prevent a reduction in the light emission quality.

Embodiment 3

Figure 5:
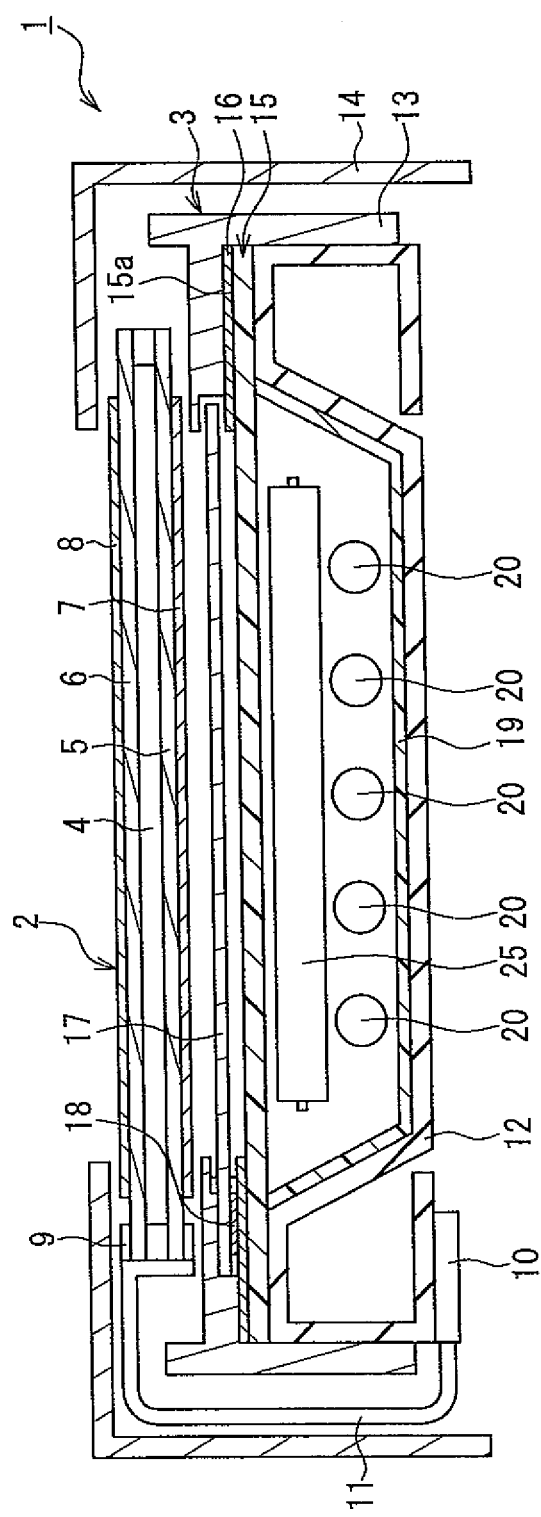
FIG. 5 is a schematic cross-sectional view showing an illuminating device and a liquid crystal display device according to Embodiment 3 of the present invention.
Figure 6:
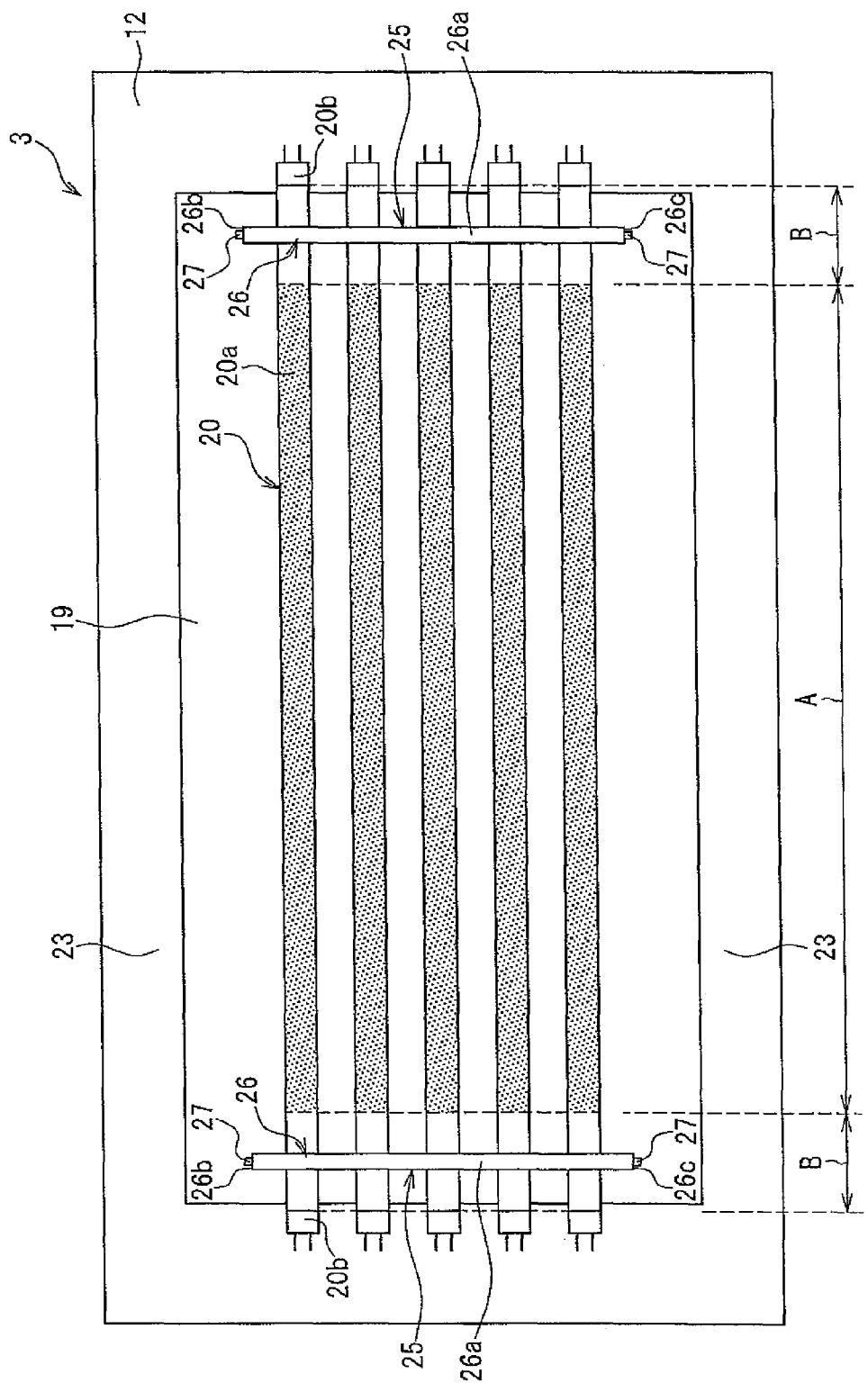
FIG. 6 is a diagram for explaining the main configuration of the illuminating device shown in FIG. 5.

FIG. 5 is a schematic cross-sectional view showing an illuminating device and a liquid crystal display device according to Embodiment 3 of the present invention. FIG. 6 is a diagram for explaining the main configuration of the illuminating device shown in FIG. 5. In FIGS. 5 and 6, this embodiment mainly differs from Embodiment 1 in that a light emitting diode is used instead of the optical fiber. The same components as those in Embodiment 1 are denoted by the same reference numerals, and the explanation will not be repeated.

As shown in FIGS. 5 and 6, in the illuminating device 3 of this embodiment, auxiliary light emitting portions 25 are provided to be symmetrical with respect to the center of the chassis 12 in the vicinity of the left and right non-lighting regions B. Each of the left and right auxiliary light emitting portions 25 includes two light emitting diodes 27 that emit light and a light guide plate 26 that is located parallel to the direction perpendicular to the longitudinal direction of the hot-cathode fluorescent tubes 20, receives light from the light emitting diodes 27, and emits the incident light toward the light emitting surface 15a. The light guide plate 26 is made of, e.g., a transparent synthetic resin. Moreover, the light guide plate 26 is attached to the inside of the chassis 12 by a supporting member (not shown) so that it is located in the middle of the non-lighting regions B between the diffusing plate 15 and the hot-cathode fluorescent tubes 20.

The light emitting diodes 27 are provided in contact with incident surfaces 26b, 26c of the light guide plate 26. Accordingly, light can be efficiently introduced into the light guide plate 26. In each of the auxiliary light emitting portions 25, while the light of the light emitting diodes 27 incident from the incident surfaces 26b, 26c of the light guide plate 26 is directed in the above perpendicular direction within the light guide plate 26, the incident light is allowed to exit appropriately from a light emitting surface 26a of the light guide plate 26 that faces the diffusing plate 15. With this configuration, similarly to Embodiment 1, the illuminating device 3 of this embodiment can prevent the occurrence of nonuniform brightness on the light emitting surface 15a.

This embodiment can have the effects comparable to those of Embodiment 1 due to the above configuration. Moreover, the illuminating device 3 of this embodiment uses the auxiliary light emitting portions 25, each of which includes the light guide plate 26 and the light emitting diodes 27. With this configuration, in the illuminating device 3 of this embodiment, the light of the light emitting diodes 27 is emitted from the light guide plate 26 toward the light emitting surface 15a as light of the auxiliary light emitting portion 25. Therefore, even if the size of the illuminating device 3 is increased, it is possible to reliably prevent a reduction in the light emission quality.

Other than the above description, a plurality of linearly arranged light emitting diodes may be used for the auxiliary light emitting portion. For example, a plurality of light emitting diodes arranged in a line are provided instead of the light guide plate, and each of the light emitting diodes emits light toward the light emitting surface, thereby serving as the auxiliary light emitting portion.

It should be noted that the above embodiments are all illustrative and not restrictive. The technological scope of the present invention is defined by the appended claims, and all changes that come within the range of equivalency of the claims are intended to be embraced therein.

In the above description, the present invention is applied to the transmission type liquid crystal display device. However, the illuminating device of the present invention is not limited thereto, and may be applied to various display devices including a non-luminous display portion that utilizes light from a light source to display information such as images and characters. Specifically, the illuminating device of the present invention can be suitably used in a semi-transmission type liquid crystal display device or a projection type display device using a liquid crystal panel as a light valve.

In the above description, the hot-cathode fluorescent tube is used. However, the discharge tube of the present invention is not limited thereto, and other discharge fluorescent tubes such as a cold-cathode fluorescent tube and a xenon fluorescent tube, or non-straight discharge fluorescent tubes such as a U-shaped tube and a pseudo U-shaped tube also can be used.

The auxiliary light emitting portions of Embodiment 1 and 3 include two optical fibers and two light emitting diodes, and light from the optical fibers and light from the light emitting diodes are introduced from two opposing sides of their respective light guide plates. However, the present invention is not limited thereto. For example, the light from the optical fibers or the light from the light emitting diodes may be introduced from one of the two sides of the light guide plate.

In Embodiment 2, the cold-cathode fluorescent tube is used as the auxiliary discharge tube. However, the auxiliary discharge tube of the present invention is not limited thereto, and other discharge tubes such as a hot-cathode fluorescent tube also can be used.

Other than the above description, Embodiments 1 to 3 may be combined as needed.

INDUSTRIAL APPLICABILITY

The present invention is useful for an illuminating device that can prevent a reduction in the light emission quality even if the size of the illuminating device is increased, and a display device using the illuminating device.

DESCRIPTION OF REFERENCE NUMERALS

1 Liquid crystal display device
3 Illuminating device
15a light emitting surface
20 Hot-cathode fluorescent tube (discharge tube)
21 Auxiliary light emitting portion
22 Light guide plate (auxiliary light emitting portion)
23 Optical fiber (auxiliary light emitting portion)
23a Incident portion
24 Cold-cathode fluorescent tube (auxiliary discharge tube, auxiliary light source portion)
25 Auxiliary light emitting portion
26 Light guide plate (auxiliary light emitting portion)
27 Light emitting diode (auxiliary light emitting portion)

The invention claimed is:

1. An illuminating device comprising:
a plurality of the discharge tubes provided along a direction perpendicular to the longitudinal direction of the discharge tubes;
a light emitting surface that emits light from the discharge tubes;
an auxiliary light emitting portion that emits light toward the light emitting surface provided in a vicinity of a non-lighting region of the discharge tubes;
the auxiliary light emitting portion comprises an optical fiber including an incident portion that is located near the discharge tube to receive light from said discharge tube, and a light guide plate that is located parallel to the perpendicular direction, receives light from the optical fiber, and emits the incident light toward the light emitting surface.

2. The illuminating device according to claim 1, wherein the auxiliary light emitting portion comprises a light emitting diode that emits light toward the light emitting surface.

3. The illuminating device according to claim 1, wherein the auxiliary light emitting portion is provided on the light emitting surface side with respect to the discharge tube.

4. A display device comprising the illuminating device according to claim 1.

5. An illuminating device comprising:
a plurality of the discharge tubes provided along a direction perpendicular to the longitudinal direction of the discharge tubes;
a light emitting surface that emits light from the discharge tubes;
an auxiliary light emitting portion that emits light toward the light emitting surface provided in a vicinity of a non-lighting region of the discharge tubes;
the auxiliary light emitting portion comprises an auxiliary discharge tube that is located parallel to the perpendicular direction.

6. An illuminating device comprising:
a plurality of the discharge tubes provided along a direction perpendicular to the longitudinal direction of the discharge tubes;
a light emitting surface that emits light from the discharge tubes;
an auxiliary light emitting portion that emits light toward the light emitting surface provided in a vicinity of a non-lighting region of the discharge tubes;
the auxiliary light emitting portion comprises a light emitting diode that emits light, and a light guide plate that is located parallel to the perpendicular direction, receives light from the light emitting diode, and emits the incident light toward the light emitting surface.

\* \* \* \* \*